United States Patent [19]

Skorupski et al.

[11] Patent Number: 5,467,645
[45] Date of Patent: Nov. 21, 1995

[54] REMOTE BRAKE PERFORMANCE TESTING SYSTEM/METHOD

[75] Inventors: Jeffrey H. Skorupski, Brighton; Thomas A. Gee, Allen Park, both of Mich.

[73] Assignee: Eaton Corporation, Cleveland, Ohio

[21] Appl. No.: 107,432

[22] Filed: Aug. 16, 1993

[51] Int. Cl.⁶ ........................................... G01L 5/28
[52] U.S. Cl. ................................. 73/121; 73/122
[58] Field of Search ................. 73/122; 356/28; 367/91; 364/426.01, 551.01

[56] References Cited

U.S. PATENT DOCUMENTS

| | | | |
|---|---|---|---|
| 4,893,242 | 1/1990 | Rogers et al. | 364/426.01 |
| 5,100,230 | 3/1992 | Brownrigg et al. | 356/28 |
| 5,129,260 | 7/1992 | van der Avoid | 73/122 |
| 5,230,242 | 7/1993 | Colarelli | 73/122 |
| 5,239,486 | 8/1993 | Mortier | 364/551.01 |
| 5,243,564 | 9/1993 | Ikeda et al. | 367/91 |

*Primary Examiner*—Richard Chilcot
*Assistant Examiner*—Jewel V. Artis
*Attorney, Agent, or Firm*—Howard D. Gordon

[57] ABSTRACT

A remote system (10)/method for testing vehicle brake or brake system performance of vehicles (30) driving past a testing module (36) adjacent a test roadway (28A) is provided. Preferably, the system/method is associated with a typical highway weight station (14–22) and includes a brake testing area (28) located in series between the usual weight scales (18) and a ramp (22) back onto a highway.

17 Claims, 3 Drawing Sheets

REMOTE BRAKE PERFORMANCE TESTING SYSTEM/METHOD

BACKGROUND OF THE INVENTION

1. Field of the Invention

The present invention relates to a remote vehicular brake system performance testing system/method which allows the performance of vehicular brake systems, especially the service brake systems of heavy-duty on-highway trucks, to be remotely tested in a roll-by test from a location remote from the vehicle.

2. Description of the Prior Art

Heavy-duty on-highway vehicles, such as tractor-semi-trailer vehicles, are required under state and/or federal laws and regulations (such as U.S. Department of Transportation CFR 393.52) to maintain certain minimum braking performance, which requires proper maintenance and adjustment of the vehicle brakes and brake systems. To assure that heavy-duty vehicles comply with existing brake performance, maintenance and/or adjustment laws and regulations, periodic inspection of vehicle brake systems are performed by various governmental agencies, such as state highway patrols and the like.

Such periodic inspections are less than satisfactory as they require stoppage of the vehicle and physical testing and measurement of brake systems on each vehicle and are thus extremely time-consuming, expensive and only practicable for very infrequent random usage. Such infrequent/random testing is not a significant inducement to cause some track operators to maintain their truck brakes in proper repair and adjustment.

SUMMARY OF THE INVENTION

In accordance with the present invention, the drawbacks of the prior art are minimized or eliminated by the provision of a remote vehicular brake testing system/method allowing the performance of vehicle brake systems to be remotely tested or screened on a drive-by basis wherein only those vehicles not exhibiting acceptable performance are stopped for physical measurement/testing of the brakes and/or brake-systems thereof.

In one embodiment of the present invention, the above is accomplished by providing vehicles with a transducer and a relatively short range transponder which will provide a signal indicative of the braking forces applied to the vehicle brakes (such as brake apply pressure or the like). At existing weigh stations or fleet terminals, after the vehicle weight is determined, vehicles will be required to achieve a certain ground speed and to tightly apply their service brakes. A remote monitor will receive the transponder signal and simultaneously measure vehicle deceleration by doppler radar or the like. Based upon the vehicle weight, the sensed braking forces and the sensed vehicle deceleration, the system will determine if the vehicle brake systems meets existing minimum performance standards. If the vehicle brake systems meets performance standards, the vehicle will be instructed to exit the terminal or weigh and brake test station. If the vehicle does not meet existing standards, it may be required to proceed to an area set aside for further testing and/or repair of the vehicle brakes or brake system. Preferably, the logic will be sufficiently sophisticated to compensate for or to sense, and/or the transponder will provide signals indicative of, application of vehicle retarders and/or engine brakes and/or downshifting in an attempt to cheat the system. The system may also provide warnings that the brakes are acceptable but out of adjustment and may require service in the near future.

A somewhat simpler system may be provided which senses only application of the brakes and deceleration rate to determine if the vehicle brake system meets at least minimal performance standards.

Accordingly, it is an object of the present invention to provide a remote vehicle brake testing system/method allowing vehicle brakes to be tested from a remote location on a drive-by basis.

This and other objects and advantages of the present invention will become apparent from a reading of the description of the preferred embodiment taken in connection with the drawings.

DESCRIPTION OF THE PREFERRED EMBODIMENT

Figure 1:
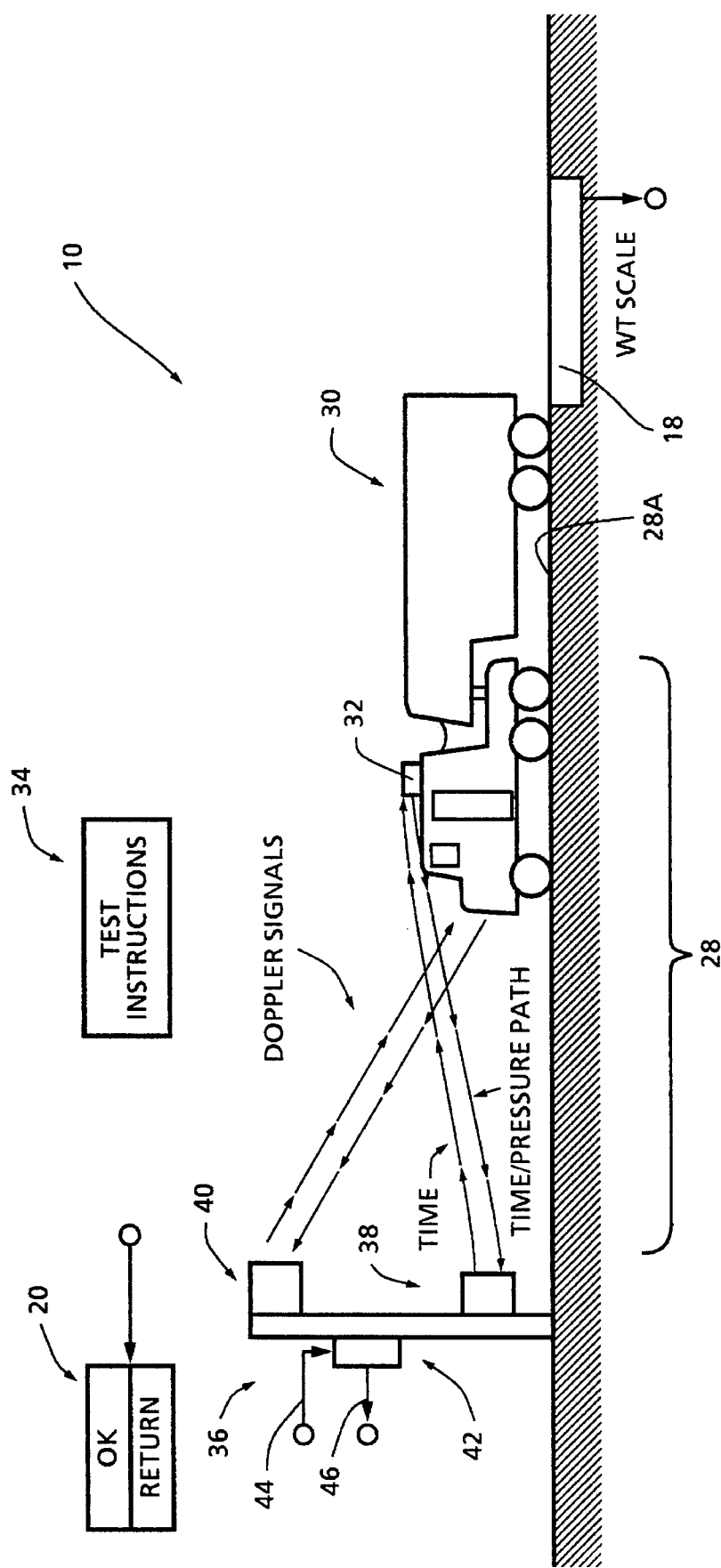
FIG. 1 is a schematic illustration of the remote vehicle brake system performance testing system of the present invention.

The remote vehicle brake system performance testing system 10 of the present invention is schematically illustrated in FIG. 1. System 10 allows a screening of vehicle brake performance in a roll-by test which is efficient, requires a minimum of time, and will allow vehicles with potentially deficient brakes or brake systems to be identified for on-vehicle in-depth brake or brake system inspection, checking and/or repair.

Figure 2:
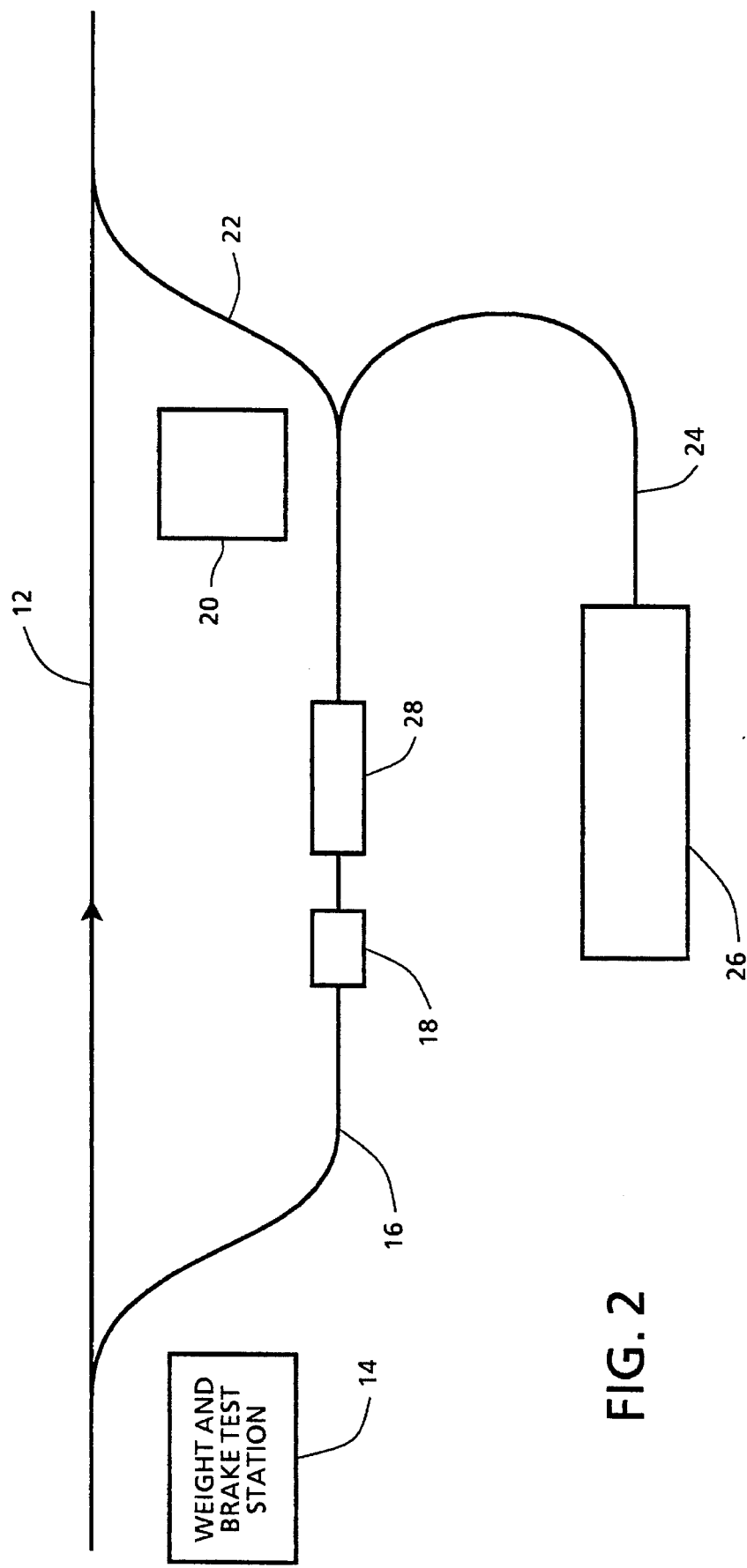
FIG. 2 is a schematic illustration of a typical combined weigh and brake system testing station.

Preferably, the remote vehicle braking system 10 of the present invention will be associated with heavy-duty vehicle weight stations, inspection stations or fleet terminals currently commonly found on or near the nation's interstate highways. Such weigh stations, see FIG. 2, are typically located on limited access, divided highways 12 and include a sign 14 informing heavy-duty vehicles that the station is open or closed, an exit ramp 16 from the highway to the station, a drive-over scale 18 for weighing the vehicle, a sign 20 informing the vehicle operator if the vehicle may or may not return to the highway, an entrance ramp 22 back to the highway and a roadway 24 leading to a parking area 26 for further vehicle inspections and/or repairs. To provide the remote brake testing system of the present invention, to the above is added a remote brake system performance testing area located in series between the scales 18 and the ramp 22 back to the highway.

Heavy-duty vehicles, such as tractor-semi-trailer 30, are provided with a transponder 32 which will provide signals, preferably RF (radio frequency) signals indicative of the braking forces being applied to the vehicle brakes. These signals will typically indicate the pneumatic or hydraulic pressure being applied to the braking system. As a possible alternative, vehicle weight may have been previously measured and/stored on board the vehicle for later use and broadcast by the transponder. The transponder 32 may also broadcast information identifying the type of vehicle and/or vehicle brake system. Information as to vehicle configuration (i.e. number of axles, trailers, wheels brakes, etc.) can also be obtained by other logic routines and/or roadway mounted sensors.

Upon leaving the scales 18, the weight of the vehicle will be known. If brake system screening is then being conducted, the vehicle will then be instructed by sign 34 to achieve a certain road speed (i.e. such as 10–30 MPH), to be shifted to neutral and then to be braked using the service brakes only.

A remote brake system performance module 36 includes a receiver 38 for receiving brake force signals, and possibly other signals, from transponder 32, a doppler radar transceiver 40 for accurately sensing the ground speed and the acceleration/deceleration of vehicle 30. A brake system performance analyzer 42, which may include an electronic microprocessor, receives inputs 44 indicative of vehicle weight from the weight scale, indicative of the braking force from receiver 38 and indicative of vehicle acceleration/deceleration from radar transceiver 40. As shown, receiver 38 may be a transceiver sending time signals which are attached to the brake force signals to assure that simultaneous data is processed by the performance analyzer. The analyzer may also receive further vehicle information from on board or site located sensing or memory devices.

Based upon the current vehicle weight, the currently applied brake forces and the current vehicle acceleration/deceleration, the performance of the vehicle brake system may be accurately estimated.

By way of example, for a land vehicle:

$$\Sigma F = m \int a = m \Delta V$$

where $\Sigma F$ = rolling resistance force (Frr)+ wind resistance (Fwr)+ grade force (Fgr)+ brake retardation force (FBr)

as mentioned previously the mass (m), velocity (v), and acceleration (a), will be measured quantities.

The summation of retarding forces, $\Sigma F$, can be discerned from two distinct portions of the velocity curve; the portion just preceding the instance of brake pressure rise and the portions after the application of brake pressure.

In the time period just preceding brake pressure: $\Sigma F_{aux}$ will be equal to Frr+Fwr+Fgr, that is, aH the resistances except for brake retardation.

$$\text{So, } Frr + Fwr + Fgr = -m \frac{\Delta V}{\Delta t} = -m \frac{\Sigma a_n}{n} = F_{aux}$$

where $$\Sigma \frac{a_n}{n}$$

is the sum of the acceleration data points in the selected time period divided by the number of points added or, where $$\frac{\Delta V}{\Delta t}$$

is the change of velocity in the time period divided by the length of time in the period selected. The time period would be selected from instances when the acceleration was always negative preceding a brake application and the period is less than 2 sec. and more than ½ sec. Other criteria may also be placed upon selecting the time to ascertain the auxiliary drag forces on the vehicle.

Furthermore, feasibility or sanity checks on the validity of the auxiliary forces can be made considering that rolling resistance should be approximately $$0.01 * M_{veh} g + A * cd (V_{veh} V_{wind})^2$$

$$+ M_{veh} g (\% \text{ grade at the test site})$$

where A has a default value of 60 ft.$^2$ that is alterable by ±20 depending upon vehicle configuration or the number and spacing of axles, and cd is derived from predetermined maps that again depend upon vehicle configuration type or number and spacing of axles as well as the relative wind yaw angle to the direction of vehicle travel; and where the Vwind is the velocity of winds from locally measured wind instruments.

The feasibility or sanity check, estimated Faux would be used as a substitute for the previously described calculated Faux if the time period in the calculation was less than the prescription or if the measured value was four times higher or lower than the estimated value. Now, the brake deficiency can be estimated from:

$$\text{Brake force deficiency} = \int_{\text{Time of interest}} \Sigma F_{Br} + M a_{veh} + F_{aux}$$

Figure 3A:
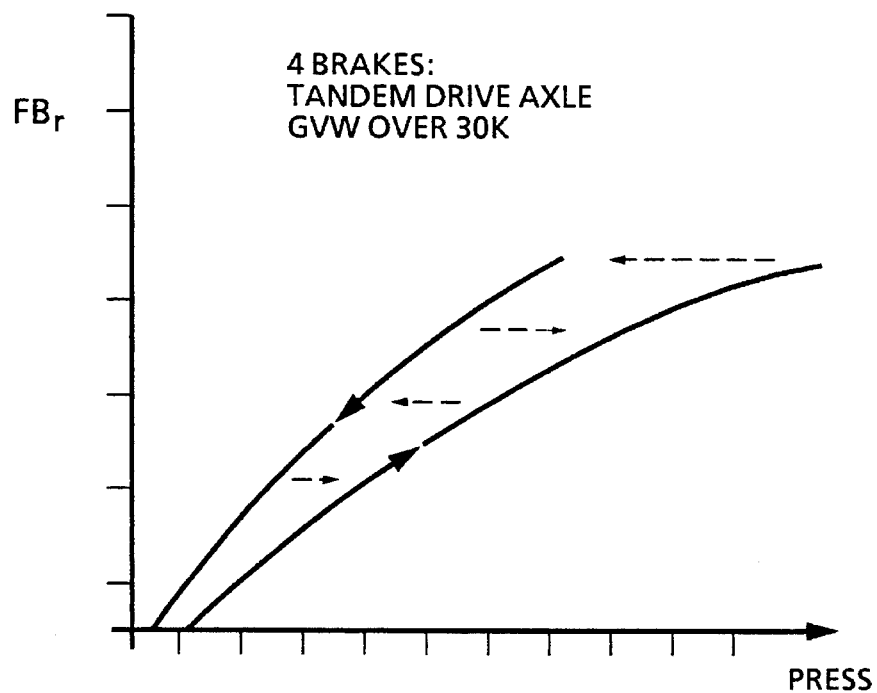
FIGS. 3A and 3B are typical brake pressure and brake force tables or graphs.
Figure 3B:
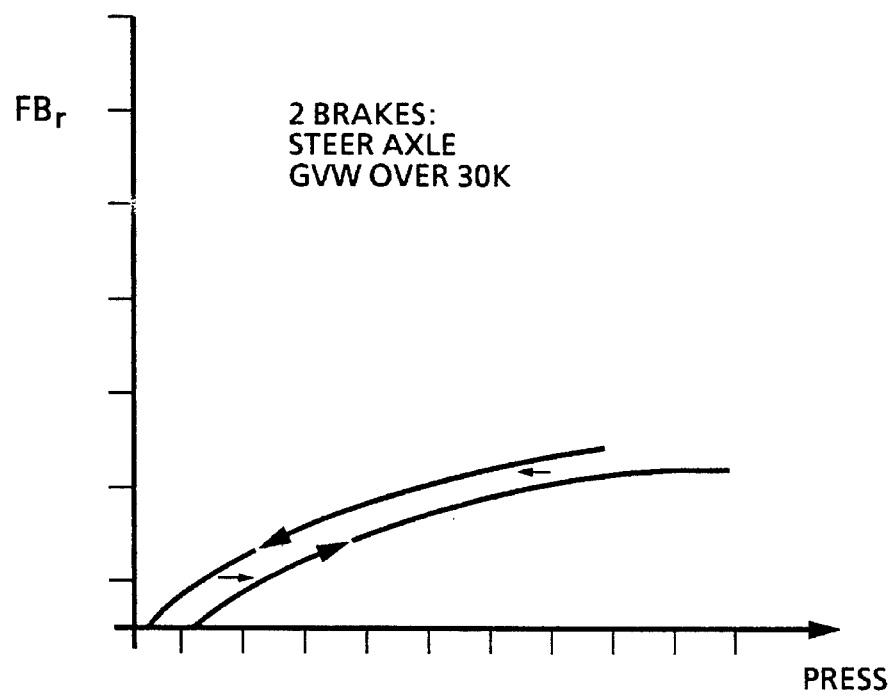

(remember: $a_{veh}$ will be negative value in braking)

where $\Sigma F_{Br}$ is a braking expectation based upon the application pressure and the number of axles on the vehicle. The braking expectation is derived from tables for typical GVW rated brakes related to pressure. They include a force expectation for increasing and decreasing pressure. The appropriate table would be located for each axle on the vehicle and using the brake pressure data (and the direction of pressure) the expected brake force would be read and added together to arrive at a braking expectation force, $\Sigma F_{Br}$. Examples of such tables may be seen by reference to FIGS. 3A and 3B.

The time of interest for the integration of the brake forces and the corresponding accelerations, would begin when the brake demand pressure had reached a minimum value Pm, say 5 psi, and would end when the vehicle reached some new, lower, speed; say $V_{veh}$=8 mph or when the pressure had exceeded 5 psi minimum value for some time, $t_{stop}$, say about 5 sec.

Although the deceleration and pressure have associated markers to correlate them in time, the pressure for use in the brake force tables would only relate to the demand pressure by way of algorithms that accounted for likely pressure changes imposed by the typical valves of the configuration. For instance, the typical relay valve on a trailer has an offset and a non-linearity of input to output as well as a hysteresis for changes in the direction of pressurization.

Using the information as described allows for one performance estimate of the vehicle brake system. Other estimates are also possible.

As an example, the brake force tables can also include maximum brake force expectations for the typical vehicle configuration. These can be used to assess, if a vehicle has too much braking, and to flag drivers that attempt to cheat the system by the use of retarders or engine braking.

Even further, the acceleration versus time data can be examined for jerkiness to isolate any nonsynchronization of brake forces and demand pressure that can be an indication of brakes that are out-of-adjustment. Even though the vehicle has sufficient braking for the driver pressure utilized in the braking force assessment, the out-of-adjustment assessment can also highlight brakes that are likely to be unacceptable.

Simultaneousnous of the data is crucial to proper brake performance analysis. The doppler data and the pressure data need to have a coincidence. Therefore, a time reference point(s) needs to be sent to the vehicle pressure transponder to be inserted into the data stream. A similar time reference marker would be inserted into the doppler's speed and deceleration data stream. From this, it can be seen that it is necessary to have two-way communication to the on-vehicle pressure data source.

Finally, presuming adequate database storage and access and that similar systems are operated throughout a wide area, perhaps nationwide, for long periods of time, and also presuming that vehicles can be distinctly identified, a time-history of the vehicle's braking parameters can be available to assess deterioration of brake performance.

The estimated vehicle brake system performance is compared to a predetermined range to determine if the vehicle brake system is acceptable or unacceptable. If acceptable, the vehicle is instructed at sign 20 to exit the station, if unacceptable, the vehicle is instructed to proceed to the inspection area 26.

Preferably, as indicated above, the analyzer includes logic (software) that is sufficiently sophisticated to sense attempts to fool the system by using retarders, engine braking or the like to supplement the vehicle service brakes during the drive-by brake system performance test.

A somewhat simpler system may be provided which senses only application of the brakes and deceleration rate to determine if the vehicle brake system meets at least minimal performance standards.

Accordingly, by utilizing the remote brake system performance testing system/method of the present invention, a relatively inexpensive, not time-consuming, drive-by vehicle brake system performance test may be conducted with sufficient frequency to be a significant deterrent to operating trucks with improperly maintained and/or adjusted brake systems.

Although the present invention has been set forth with a certain degree of particularity, it is understood that various modifications are possible without departing from the spirit and the scope of the invention as hereinafter claimed.

We claim:

1. A method for testing vehicle brake system performance of a vehicle brake system on a vehicle (30) driving on a test roadway (28A) past a brake performance test module (36), said method comprising:

providing a first sensor (18) in said roadway for sensing vehicle weight and for providing a first input signal indicative thereof, providing a second sensor (32) on-board said vehicle for sensing brake application force and for providing a second input signal indicative thereof, providing a third sensor (40) at said module for sensing one of vehicle ground speed and the rate of change of vehicle ground speed of said vehicle on said roadway and for providing a third input signal indicative thereof;

providing a brake performance monitor (42) for receiving said first, second and third input signals and for processing same according to predetermined logic rules to determine if the performance of said vehicle brake system is within predetermined acceptable standards or is not within said predetermined acceptable standards; and causing said vehicle to travel at a predetermined range of ground speed on said roadway and then causing said brake system to be applied to retard said vehicle on said roadway.

2. The method of claim 1 wherein an instruction device (34) is provided adjacent said roadway to cause said vehicle to travel at said predetermined range of ground speed and then cause said brake system to be applied.

3. The method of claim 1 further comprising providing a test result indicia device (20) adjacent said roadway and causing said monitor to issue command output signals 46 to said indicia device to cause said indicia device to indicate that brake system performance is or is not within said predetermined acceptable standards.

4. The method of claim 1 wherein said second sensor includes a radio frequency transceiver and said monitor includes a radio frequency receiver.

5. The method of claim 4 wherein said brake system is pressurized fluid operated and said second input signal is indicative of brake system apply fluid pressure.

6. A system for testing vehicle brake system performance of a vehicle brake system on a vehicle (30) driving on a test roadway (28A) past a brake performance test module (36), said system comprising:

a first sensor (18) in said roadway for sensing vehicle weight and for providing a first input signal indicative thereof, a second sensor (32) on-board said vehicle for sensing brake application force and for providing a second input signal indicative thereof, a third sensor (40) at said module for sensing one of vehicle ground speed and the rate of change of vehicle ground speed of said vehicle on said roadway and for providing a third input signal indicative thereof;

a brake performance monitor (42) for receiving said first, second and third input signals and for processing same according to predetermined logic rules to determine if the performance of said vehicle brake system is within predetermined acceptable standards or is not within said predetermined acceptable standards; and means for causing said vehicle to travel at a predetermined range of ground speed on said roadway and then causing said brake system to be applied to retard said vehicle on said roadway.

7. The system of claim 6, wherein an instruction device (34) is provided adjacent said roadway to cause said vehicle to travel at said predetermined range of ground speed and then cause said brake system to be applied.

8. The system of claims 6 or 7 further comprising a test result indicia device (20) adjacent said roadway, said monitor effective to issue command output signals 46 to said indicia device to cause said indicia device to indicate that brake system performance is or is not within said predetermined acceptable standards.

9. The system of claims 6 or 7 wherein said second sensor includes a radio frequency transceiver and said monitor includes a radio frequency receiver.

10. The system of claim 9 wherein said brake system is pressurized fluid operated and said second input signal is indicative of brake system apply fluid pressure.

11. The system of claims 6 or 7 wherein said third sensor includes a doppler radar transceiver.

12. The system of claims 6 or 7 wherein said monitor includes a microprocessor based computer.

13. A method for testing vehicle brake system performance of a vehicle brake system on a vehicle (30) driving on a test roadway (28A) past a brake performance test module (36), said method comprising:

providing a first means for determining vehicle weight and for providing a first input signal indicative thereof, providing a second sensor (32) on-board said vehicle for sensing brake application force and for providing a second input signal indicative thereof, providing a third sensor (40) at said module for sensing one of vehicle ground speed and the rate of change of vehicle ground speed of said vehicle on said roadway and for providing a third input signal indicative thereof; and providing a brake performance monitor (42) for receiving said first, second and third input signals and for processing same according to predetermined logic rules to determine if the performance of said vehicle brake system is within predetermined acceptable standards or is not within said predetermined acceptable standards.

14. A system for testing vehicle brake system performance of a vehicle brake system on a vehicle (30) driving on a test roadway (28A) past a brake performance test module (36), said system comprising:

a first means for determining vehicle weight and for providing a first input signal indicative thereof, a second sensor (32) on-board said vehicle for sensing brake application force and for providing a second input signal indicative thereof, a third sensor (40) at said module for sensing one of vehicle ground speed and the rate of change of vehicle ground speed of said vehicle on said roadway and for providing a third input signal indicative thereof; and a brake performance monitor (42) for receiving said first, second and third input signals and for processing same according to predetermined logic rules to determine if the performance of said vehicle brake system is within predetermined acceptable standards or is not within said predetermined acceptable standards.

15. A method for testing vehicle brake system performance of a vehicle brake system on a vehicle (30) driving on a test roadway (28A) past a brake performance test module (36), said method comprising:

providing a first sensor (32) on-board said vehicle for sensing brake application force and for providing a first input signal indicative thereof, providing a second sensor (40) at said module for sensing one of vehicle ground speed and the rate of change of vehicle ground speed of said vehicle on said roadway and for providing a second input signal indicative thereof; and providing a brake performance monitor (42) for receiving said first and second input signals and for processing same according to predetermined logic rules to determine if the performance of said vehicle brake system is within predetermined acceptable standards or is not within said predetermined acceptable standards.

16. The method of claims 1 or 13 wherein said second and third signals are indicative of the values of brake application force and one of vehicle ground speed and rate of change of vehicle ground speed, respectively, at an indicated time.

17. The system of claims 6 or 14 wherein said second and third signals are indicative of the values of brake application force and one of vehicle ground speed and rate of change of vehicle ground speed, respectively, at an indicated time.

* * * * *